Figure 1:
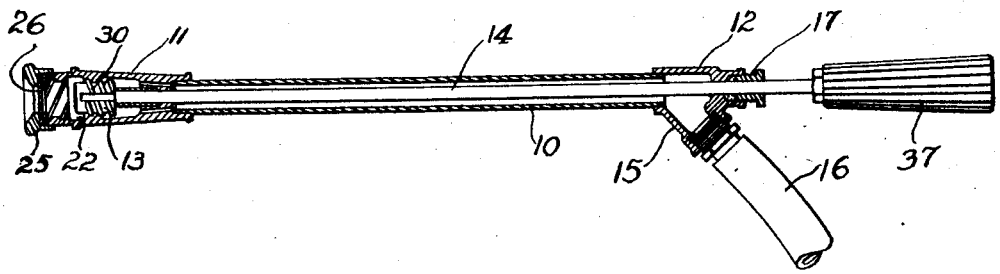

Oct. 9, 1928.

G. E. TRISLER

SPRAY GUN

Filed April 7, 1924

1,686,885

Inventor
George E. Trisler
By Bates Macklin Goldrick & Peare
Attorneys

Patented Oct. 9, 1928.

1,686,885

UNITED STATES PATENT OFFICE.

GEORGE E. TRISLER, OF SALEM, OHIO, ASSIGNOR TO THE DEMING COMPANY, OF SALEM, OHIO, A CORPORATION OF OHIO.

SPRAY GUN.

Application filed April 7, 1924. Serial No. 704,656.

This invention is concerned with improvements in "spray guns" which are used for spraying insecticide on trees, plants, etc., and more particularly this invention is directed toward improvements in a spraying device set forth in Patent No. 1,348,631 issued August 3rd, 1920, to Wm. L. Deming and C. Cornwall. Briefly, the device set forth in that patent embodies a tubular member having a nozzle adjacent one end thereof, and having a hose connection at the other end.

The present invention has for its objects the provision of a nozzle which embodies certain advantages over that illustrated in the above patent, such as simplicity in construction, the reduction of hydraulic friction, the diminution of the tendency to clog, and the ease whereby the nozzle may be cleaned.

The preferred means for carrying out my invention is illustrated in the drawings and is hereinafter set forth in detail in the following description. The essential features and characteristics of my invention are summarized in the claims.

Figure 2:
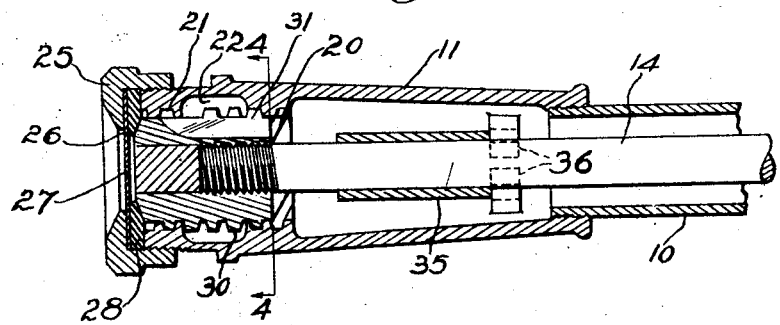
Figure 3:
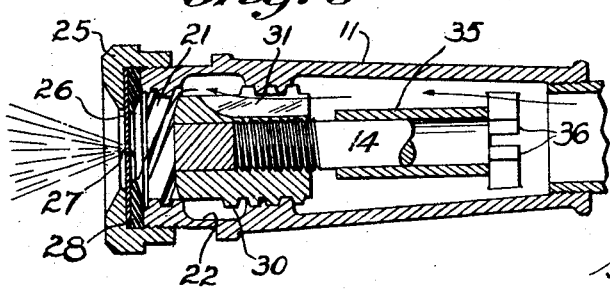
Figure 4:
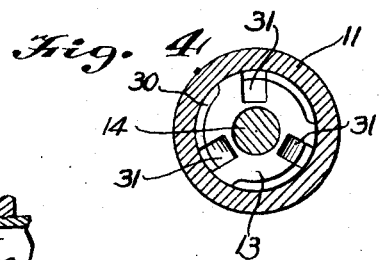

In the drawings, Fig. 1 is a longitudinal section through a spray gun embodying my invention; Fig. 2 is a similar section on an enlarged scale adjacent the nozzle end of the device showing the closed position of the nozzle; Fig. 3 is a similar section showing the nozzle in open position, and Fig. 4 is a section taken on the line 4—4 in Fig. 2.

My invention is shown in connection with a spray gun having a tubular body or casing 10, one end of which is threaded to receive a hollow member 11, and the other end of which is threaded to receive a hollow member 12. The members 11 and 12 support a head 13 and stem 14 respectively, by which the flow of spraying fluid may be controlled.

Fluid may be led into the casing 10 through an offset portion 15 in the member 12 which is adapted to be connected to a hose 16. The member 12 is also provided with a stuffing box 17, which functions not only to support the stem, but also to permit rotation thereof for controlling the movement of the head 13 and to provide a fluid tight joint between the member 12 and the stem.

The member 11 is illustrated as a casing, which is internally threaded at 20 and 21 with preferably square threads separated by a recess 22. Each thread is a continuation of the other so that the head 13 which is externally threaded may be rotated continuously from the thread 20 to the thread 21, notwithstanding the intermediate recess. The threads are preferably multiple—triple threads being shown in the drawing—to reduce the retardation of the flow through the final thread groove to the chamber behind the discharge opening. Multiple threads provide a plurality of openings into the chamber between the head 13 and the disc 26 whereby a uniform rotation is given the liquid before it is discharged thru the orifice 27. A steep pitch of thread is advantageous because it provides more direct and easy flow past the head. Thus the mutual desirability of easy flow and multiple outlets are combined in multiple threads. The member 11 is also threaded externally to receive a cap 25 which may be employed to position a disc 26 having a central opening 27 therein, against a washer 28, which in turn co-operates with the head to provide a valve for controlling the liquid flow.

The head 13 is rigidly connected to the stem 14 and is provided with external square threads 30 so as to permit movement of the head to the closed position shown in Fig. 2, or to the full open position as shown in Fig. 3. The head is provided with slots 31, preferably three in number, which extend longitudinally of the head from the inner end thereof to a point near the outer end thereof. These slots, therefore, provide passageways which extend in the general direction of liquid flow, thus obviating the necessity for a member having small internal passageways which increase the hydraulic friction and tend to become clogged by the particles held in suspension in the liquid. Moreover, as shown in Fig. 3, the spraying liquid has relatively large passageways, whenever the valve is in open position.

The threads 30 on the head terminate short of the forward end of the head as shown in Fig. 3 which causes the spraying fluid to pass through the threaded portion 21 when the valve is partially opened and thereby to effect a spraying action of the fluid before it is ejected through the opening in the disc 26. The extent of the spraying action may accordingly be controlled by the position of the head with reference to the disc, the finest spray being obtained when the head is nearest the disc.

To limit inward movement of the head, I have shown a sleeve 35 surrounding the stem and having one end thereof adapted to engage lugs 36 which extend inwardly from the member 11. The other end of the sleeve is adapted to engage the inner end of the head. Outward movement of the head is limited by engagement with the washer 28. Axial movement of the head is obtained upon rotation of a handle 37 which is attached to the outer end of the stem.

An advantage of a spray gun embodying my invention is that upon removal of the cap, disc, and washer, the stem may be turned sufficiently to permit the ejection of the head from the member 11, wherefor the slotted passageways are readily accessible for cleansing purposes. Moreover, the use of slotted passageways in the head not only facilitates the manufacture of the nozzle, but also insures a more efficient operation by reducing the hydraulic friction through the head.

Having thus described my invention, I claim:

1. In a spray nozzle, the combination of a hollow casing member comprising the body of the nozzle through which fluid passes entering at one end of the member and discharging at the other end of the member, a conduit joined to the inlet end of the casing member, the outlet end of the casing member being internally threaded with a multiple thread, a cylindrically formed head of diameter equal to the internal diameter of the threaded portion of said hollow casing member, said head having multiple external threads on that portion disposed toward the inlet end of said hollow casing member, said threads being in engagement with the inner portion of the threads on said casing member, the end portions of the head disposed toward the discharge end of the hollow casing member being smooth and being in contact with the outer portion of the internal threads in the hollow casing member, said head having longitudinally extending slots cut in its surface through the threaded portion thereof and of a greater depth than the depth of the threads, and extending in the direction of the flow of fluid a limited distance beyond the external threads, the number of slots equalling the number of threads in the casing member, means removably secured to the discharge end of said casing and having a centrally disposed orifice, and a stem secured to the end of the head remote from the discharge end of the casing and extending through said conduit.

2. In a spray nozzle, the combination of a hollow casing member comprising the body of the nozzle through which fluid passes entering at one end of the member and discharging at the other end of the member, a conduit joined to the inlet end of the casing member, the outlet end of the casing member being internally threaded, a cylindrically formed head of diameter equal to the internal diameter of the threaded portion of said hollow casing member, said head having external threads on that portion disposed toward the inlet end of said hollow casing member, said threads being in engagement with the inner portion of the threads on said casing member, the side surface of the head disposed toward the discharge end of the hollow casing member being smooth and being in contact with the outer portion of the internal threads in the hollow casing member, said head having longitudinally extending slots cut in its surface through the threaded portion thereof and of a greater depth than the depth of the threads, and extending in the direction of the flow of fluid a limited distance beyond the external threads, a cap removably secured to the discharge end of said casing, a disc having a centrally disposed orifice and an annular washer secured by said cap against the discharge end of said casing, a stem secured to said head and extending through said conduit and means for rotating said stem to move said head axially of said casing.

In testimony whereof, I hereunto affix my signature.

GEORGE E. TRISLER.